United States Patent [19]

Cooper

[11] 4,313,920

[45] Feb. 2, 1982

[54] CARBON BLACK AGGLOMERATE PRODUCTION

[75] Inventor: William T. Cooper, Bartlesville, Okla.

[73] Assignee: Phillips Petroleum Co., Bartlesville, Okla.

[21] Appl. No.: 124,890

[22] Filed: Feb. 26, 1980

[51] Int. Cl.³ .................. C01B 31/02; C09C 1/48
[52] U.S. Cl. .................. 423/449; 423/450; 55/15
[58] Field of Search ........... 423/445, 449, 450, 455, 423/456, 461; 55/15; 422/150

[56] References Cited

U.S. PATENT DOCUMENTS

| | | | |
|---|---|---|---|
| 2,535,679 | 12/1950 | Horsley et al. | 183/114 |
| 2,720,939 | 10/1969 | Stokes | 423/461 |
| 2,769,503 | 11/1956 | Abboud | 183/58 |
| 2,785,964 | 3/1957 | Pollock | 23/314 |
| 2,901,324 | 8/1959 | Howell | 23/209.6 |
| 2,962,120 | 11/1960 | Lagarias | 183/61 |
| 3,053,031 | 9/1962 | Vedder et al. | 55/292 |
| 3,369,870 | 2/1968 | Ganz et al. | 423/450 |
| 3,410,055 | 11/1968 | Zenz | 55/96 |

FOREIGN PATENT DOCUMENTS 711286 6/1954 United Kingdom .

OTHER PUBLICATIONS

Chem. Abstracts 57:14453 B.

*Primary Examiner*—O. R. Vertiz
*Assistant Examiner*—Gregory A. Heller

[57] ABSTRACT

Smoke containing unagglomerated carbon black is subjected to sonic carbon black agglomeration thereby reducing the filter load and the danger of heat exchanger blockage.

4 Claims, 1 Drawing Figure

U.S. Patent
Feb. 2, 1982
4,313,920
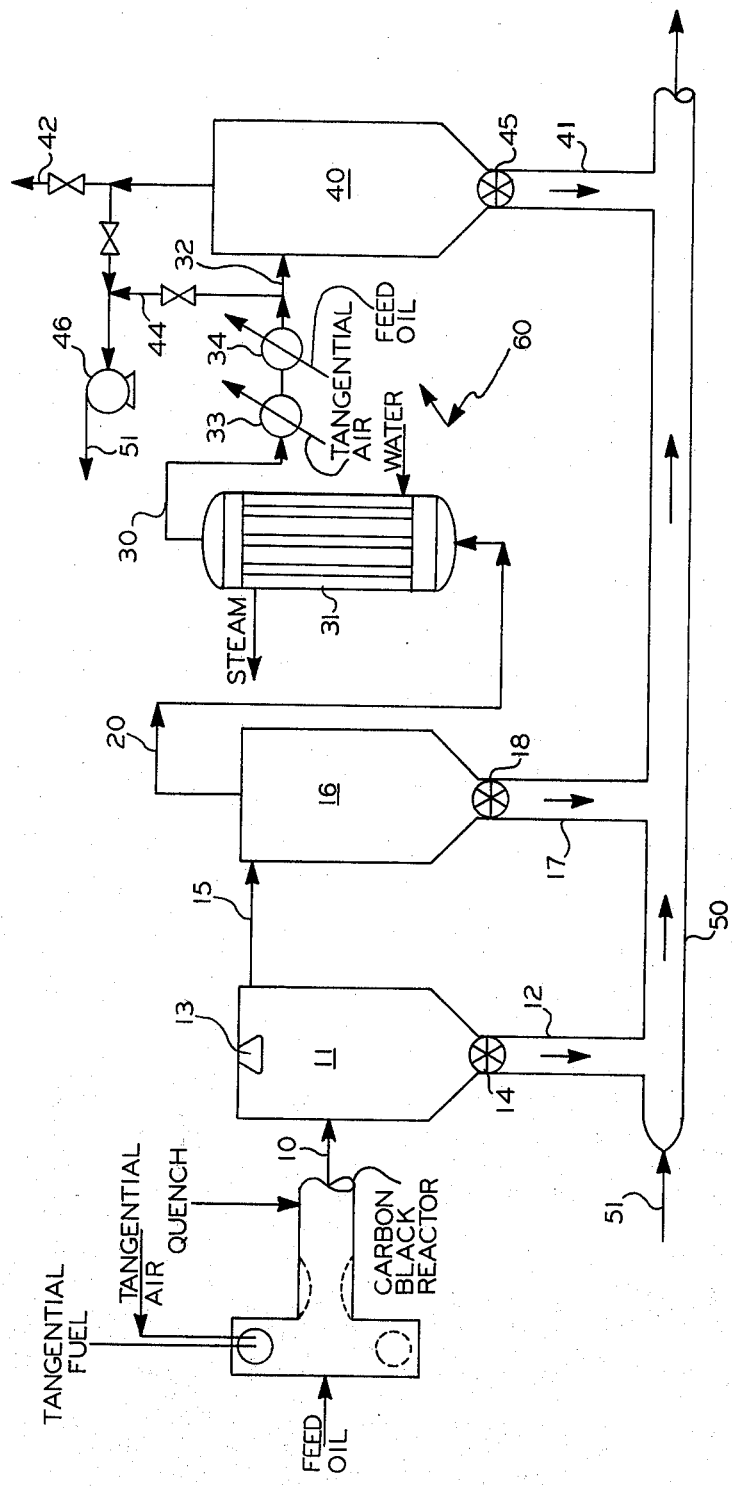

CARBON BLACK AGGLOMERATE PRODUCTION

The present invention relates to a process to produce carbon black agglomerates. In accordance with another aspect, the invention relates to an apparatus for producing such carbon black agglomerates.

BACKGROUND OF THE INVENTION

In the production of carbon black, particularly in the processes that can be characterized as furnace black processes, a smoke is generated which contains very small carbon black particles. These particles are so small that they do not readily settle out of the carrier gas. It is presently common practice to pass the carbon black containing smoke through elongated bag filters to separate the carbon black. These filter bags are arranged in large houses and the operation of such a filter house is both technically and economically difficult and environmentally sensitive. Improvements in the technique of recovering carbon black from the carbon black containing smoke are, therefore, highly desirable.

THE INVENTION

It is thus one object of this invention to provide a process for producing carbon black agglomerates requiring a significantly reduced filter capacity at the same throughput.

Another object of this invention is to provide a process for producing carbon black agglomerates in an agglomerator without using a filter thus enabling the carbon black manufacturer to continuously withdraw carbon black agglomerates from such an agglomerator.

Still another object of this invention is to provide an apparatus for carrying out the process defined.

These and other objects, advantages, details, features and embodiments of this invention will become apparent to those skilled in the art from the following detailed description of the invention, the appended claims and the drawing which shows a schematical cross-sectional representation of the apparatus of this invention.

In accordance with this invention a process to produce carbon black agglomerates is provided in which smoke from a carbon black reactor containing non-agglomerated carbon black particles is subjected to sound waves. The sound waves cause agglomeration of the carbon black particles in the smoke and these carbon black agglomerates constitute at least a portion of a solid phase in a continuous gas phase. At least a portion of the carbon black agglomerates are withdrawn from the gas phase and recovered as the product of the process.

One or more of the following preferred and detailed steps constitute further embodiments of this invention. The hot smoke containing the non-agglomerated carbon black particles is preferably first cooled to a temperature where essentialy no carbon black forming reaction occurs. This step as such is a standard technique and is generally achieved by quenching the hot carbon black containing smoke with a non-oxidizing quench fluid such as cooled carbon black containing smoke or water. The precooling of the carbon black containing smoke generally brings the temperature of the smoke down into the range of 1500° to 2100° F.

The precooled smoke is introduced into a sonic agglomerator in which the precooled smoke is subjected to the sound waves. Larger carbon black agglomerates formed in this agglomerator settle in the unit and the settled carbon black agglomerates are recovered from the agglomerator. The remaining gas stream is passed from the sonic agglomerator into a cyclone separator and further carbon black agglomerates are separated from the gas stream in this separator. These agglomerates are also recovered and the remaining gas stream with a low carbon black content is then passed through heat exchange units and finally through a filter to remove the remaining small, but economically possibly significant quantity of carbon black from the gas stream.

The thus obtained gas stream is a relatively high Btu gas stream and this gas stream can be either used as a boiler fuel or preferably is used as part of the fuel required in the furnace process for producing the carbon black containing smoke.

Further preferred details of this invention will become apparent from the following description of the drawing. A quenched carbon black reactor effluent having a temperature of approximately 2000° F. is passed via line 10 into a high temperature sonic agglomerator 11. In this agglomerator the smoke containing essentially non-agglomerated carbon black is subjected to sonic waves from a sound source 13. The sonic waves preferably are in a frequency range of about 10 to 30 KHz, and most preferably in a range of 15 to 20 KHz.

The carbon black particles leaving the carbon black furnace in the quenched smoke stream generally are in a particle size range of up to about 1 to 5 microns. The treatment of the carbon black containing smoke with the sound waves causes the formation of carbon black agglomerates most of which are in a particle size range of up to about 40 microns.

The larger agglomerates formed in the high temperature sonic agglomerator 11 settle by gravity alone in the lower portion thereof. From this lower portion the agglomerated separated carbon black is withdrawn via a star valve 14. The carbon black is passed via line 12 to a conveyor 50. This conveyor may be a gas conveyor operated with a conveying gas introduced via line 51.

Carbon black containing gas is withdrawn from the high temperature agglomerator 11 and passed via line 15 to a cyclone separating unit 16. This unit may comprise a plurality of seriatim arranged cyclones. For simplicity purposes, only one cyclone has been shown in the drawing. In the cyclone 16 carbon black agglomerates are further separated from the gas stream and collected in the lower portion of the cyclone 16. These carbon black agglomerates are withdrawn by means of star valve 18 and are passed via line 17 to conveyor 50.

A gas stream containing only roughtly 5 to 20% of the original carbon black present in the smoke of line 10 is withdrawn from the cyclone 16 and passed via line 20 into a heat exchange unit 60. In the drawing this heat exchange unit 60 is shown to comprise 3 indirect heat exchangers 31, 33, and 34. Heat exchanger 31 is a tube and shell heat exchanger. Water is introduced into the shell side and withdrawn as steam whereas the gas with the low carbon black content is passed through the tubes. The further cooled carbon black containing gas is withdrawn via line 30 and passed through heat exchangers 33 and 34 in which for instance air used in the carbon black furnace for the generation of the hot combustion gases may be preheated whereas feedstock passed to the carbon black reactor may be preheated in the heat exchanger 34. A portion of the cooled gas with low carbon black content is passed via line 44 by means of blower 46 to line 51 (the connection is not shown in the drawing).

The remainder of the cooled gas with low carbon black content is passed via line 32 into a filter unit 40 which may consist of a plurality of filters, one of which has been schematically shown in the drawing. In the filter unit 40 carbon black is removed from the gas stream and the collected carbon black is passed via star valve 45 and line 41 to conveyor 50. From this conveyor 50 all the carbon black collected is passed to further processing, for instance to a pelletizer to produce the carbon black pellets.

A relatively high Btu (heating value) gas leaves the filter unit 40 via line 42. A portion of this high Btu fuel gas can also be used as conveying gas by passing this portion to the intake side of blower 46.

The gas containing a low amount of carbon black leaving the heat exchanger unit 60 and flowing through lines 32 and 44 has a temperature of approximately 400° F.

A calculated example to illustrate a typical planned operation is given in the following table where the reference numerals in parentheses refer to the various lines shown in the drawing.

TABLE

| (10) Smoke from Reactor: | |
|---|---|
| Temperature, °F. | 2,000 |
| Pressure, psia, | 20 |
| SCF/hr., | 200,000 |
| Lbs. carbon black/hr, | 1,200 |
| Lbs. carbon/1000 SCF, | 6 |
| (15) Gas from Agglomerator (11) which is operated at | |
| Frequency, KHz | 17 |
| and at Decibels | 100 |
| Temperature, °F., (about) | 2,000 |
| Pressure, psia, | 19 |
| Lbs. carbon/1000 SCF, | 4 |
| (20) Gas from Cyclone Unit 16: | |
| Temperature, °F., (about) | 2,000 |
| Pressure, psia, | 18 |
| Lbs. carbon/1000 SCF, | 0.5 |
| (30) Gas from Shell-Tube Boiler (31): | |
| Temperature, °F., (about) | 1,200 |
| Pressure, psia, | 16 |
| Lbs. carbon/1000 SCF, | 0.5 |

One of the advantages achieved by this invention resides in using a gas stream with low carbon black content in a boiler 31 for generating steam. The gas having a temperature of 2000° F. only contains about 0.5 Lbs. of carbon black per 1000 SCF. Conventionally 6 Lbs of carbon black are present in 1000 SCF smoke. Therefore, the time between necessary cleanups of the tubes of boiler 31 is therefore significantly increased and the heat exchanged efficiency is improved in accordance with this invention as compared to the conventional operation.

This invention's operation produces a gas-carbon black mass which is charged through the tubes of the shell-tube boiler wherein:

(a) there is a relatively low concentration of carbon black in this gas—which mass, therefore, should deposit less black per unit of time than would the same rate of flow of gas containing a higher carbon black concentration; and, (b) the carbon black in this gas is already partially agglomerated, and, it is believed, partially agglomerated carbon black will not deposit on the inner peripheries of the tubes of the shell-tube boiler as rapidly as do the smaller particles of carbon black.

Reasonable variations and modifications which will become apparent to those skilled in the art can be made in this invention without departing from the spirit and scope thereof.

I claim:

1. A process for producing carbon black comprising
   (a) generating a stream of hot smoke comprising essentially non-agglomerated carbon black particles suspended in a combustion gas by subjecting a carbon containing feed stock to carbon black formation conditions,
   (b) precooling said hot smoke to a temperature in the range of about 1500° to 2100° F.,
   (c) introducing the precooled smoke into a sonic agglomerator wherein said precooled smoke is subjected to sound waves, thereby agglomerating said non-agglomerated carbon black particles to form a two-phase system of a continuous gas phase containing a solid phase of carbon black agglomerates,
   (d) letting said two-phase system at least partially separate into a carbon black agglomerate mass and a gas mass of reduced carbon black content,
   (e) passing said gas mass of reduced carbon black content from said sonic agglomerator into a cyclone separator causing the separation of further carbon black agglomerates from said gas mass,
   (f) withdrawing a gas stream with low carbon black content from said cyclone separator,
   (g) passing said gas stream with low carbon black content through an indirect heat exchanger for cooling said gas stream and heating a fluid,
   (h) passing said gas stream with low carbon black content from the heat exchanger through a filter unit, (i) collecting the carbon black separated from the precooled smoke in the sonic agglomerator, from the gas mass in the cyclone and from the cooled gas stream with low carbon black content in the filter as a carbon black product of the process.

2. A process in accordance with claim 1 wherein said feedstock is passed through said indirect heat exchanger to indirect heat exchange with said gas of low carbon black content.

3. A process in accordance with claim 1 wherein said hot smoke is generated by contacting a hydrocarbon feedstock with hot combustion gas obtained by combusting fuel and air and
   wherein said feedstock and/or said fuel and/or said air are preheated in said indirect heat exchanger by indirect heat exchange with said gas of low carbon black content.

4. A process in accordance with claim 1 wherein said hot smoke is precooled by contacting the hot smoke with a non-oxidizing quench fluid selected from the group consisting of cooled carbon black containing smoke, water or mixtures thereof.

* * * * *